(12) United States Patent
Kawai et al.

(10) Patent No.: US 10,265,894 B2
(45) Date of Patent: Apr. 23, 2019

(54) TRANSFER SHEET, DECORATIVE SHEET, AND DECORATIVE ARTICLE

(71) Applicant: Nissha Co., Ltd., Kyoto-shi, Kyoto (JP)

(72) Inventors: Yurika Kawai, Kyoto (JP); Hikaru Nishigaki, Kyoto (JP); Atsumasa Matsumoto, Kyoto (JP); Masato Osaki, Kyoto (JP)

(73) Assignee: Nissha Co., Ltd. (JP)

( * ) Notice: Subject to any disclaimer, the term of this patent is extended or adjusted under 35 U.S.C. 154(b) by 0 days.

(21) Appl. No.: 15/777,642

(22) PCT Filed: May 25, 2017

(86) PCT No.: PCT/JP2017/019548
§ 371 (c)(1),
(2) Date: May 18, 2018

(87) PCT Pub. No.: WO2017/217212
PCT Pub. Date: Dec. 21, 2017

(65) Prior Publication Data
US 2018/0370097 A1    Dec. 27, 2018

(30) Foreign Application Priority Data

Jun. 17, 2016 (JP) .................................. 2016-120942
Jun. 17, 2016 (JP) .................................. 2016-120943

(51) Int. Cl.
*B29C 45/14* (2006.01)
*B32B 27/08* (2006.01)
(Continued)

(52) U.S. Cl.
CPC .. *B29C 45/14827* (2013.01); *B29C 45/14811* (2013.01); *B32B 7/06* (2013.01);
(Continued)

(58) Field of Classification Search
CPC .............. B29C 45/14; B29C 45/14827; B29C 45/14811; B32B 7/06; B32B 7/12;
(Continued)

(56) References Cited

U.S. PATENT DOCUMENTS

2005/0090394 A1* 4/2005 Hirota ................. B41M 7/0027
503/201
2007/0202301 A1* 8/2007 Taniwaki ................. B32B 7/12
428/143

(Continued)

FOREIGN PATENT DOCUMENTS

JP      2015-182302      10/2015

*Primary Examiner* — Patricia L. Nordmeyer
(74) *Attorney, Agent, or Firm* — Thorpe North & Western

(57) ABSTRACT

A transfer sheet includes, on a base sheet, at least a release layer containing particles and having a surface roughness Ra of 0.15 to 1.0 μm, a protective layer containing an ionizing radiation-curable urethane resin and having a Martens hardness of 2.0 to 40.0 N/mm², and the adhesive layer containing an acrylic resin, that are laminated in this order. A decorative sheet is formed by transferring the transfer sheet on a support sheet. A decorative article is a resin molded article decorated by using the transfer sheet or the decorative sheet.

8 Claims, 11 Drawing Sheets

(51) Int. Cl.
  *B32B 27/40* (2006.01)
  *B32B 7/12* (2006.01)
  *B32B 7/06* (2019.01)
  *B32B 27/00* (2006.01)
  *B29K 675/00* (2006.01)

(52) U.S. Cl.
  CPC ............... *B32B 7/12* (2013.01); *B32B 27/00* (2013.01); *B32B 27/08* (2013.01); *B32B 27/40* (2013.01); *B29K 2675/00* (2013.01); *B29K 2715/006* (2013.01); *B29K 2995/002* (2013.01); *B29K 2995/007* (2013.01); *B29K 2995/0072* (2013.01); *B29K 2995/0089* (2013.01)

(58) Field of Classification Search
  CPC ......... B32B 27/00; B32B 27/08; B32B 27/40; B29K 2675/00; B29K 2715/006; B29K 2995/002; B29K 2995/007; B29K 2995/0072; B29K 2995/0089
  See application file for complete search history.

(56) References Cited

U.S. PATENT DOCUMENTS

| | | | |
|---|---|---|---|
| 2010/0062218 A1* | 3/2010 | Atake | B29C 45/14827 428/141 |
| 2010/0196651 A1* | 8/2010 | Liao | B29C 43/18 428/76 |
| 2015/0017371 A1* | 1/2015 | Rho | B41M 7/0027 428/41.8 |

* cited by examiner

FIG. 3C (IONIZING RADIATION)

FIG. 4B A-A CROSS-SECTIONAL VIEW

FIG. 9B A-A CROSS-SECTIONAL VIEW

MOLTEN RESIN

MOLTEN RESIN

TRANSFER SHEET, DECORATIVE SHEET, AND DECORATIVE ARTICLE

TECHNICAL FIELD

The present technology relates to a transfer sheet, a decorative sheet, and a decorative article.

BACKGROUND ART

Depending on various needs of consumers in recent years, various functions are imparted for resin molded articles, such as cases of portable terminals and interior parts of vehicles, besides decorations for appearance. One of them is a smooth and moist tactile impression. Such a tactile impression can be achieved by transferring a transfer sheet, in which a base sheet, a release layer containing particles, a protective layer formed from an ionizing radiation-curable resin, and an adhesive layer are laminated in this order, onto a surface of a resin molded article (e.g. see Japan Unexamined Patent Publication No. 2015-182302). In this transfer sheet, particles having a certain size in a certain amount are mixed in a resin constituting a release layer and coated on a base sheet, and a protective layer is formed thereon, and thus recesses and protrusions due to the particles are formed on a surface of the protective layer after the transfer. Because of the concavo-convex shape, a smooth and moist tactile impression can be imparted to the surface of the resin molded article.

Furthermore, for example, such a tactile impression can be achieved by injection molding by using a decorative sheet, obtained by transferring the transfer sheet described above to an object to be transferred such as a support sheet.

However, for known transfer sheets and decorative sheets, a problem exists in that a soft tactile impression cannot be achieved even though a smooth tactile impression is achieved because the tactile impression is imparted only by the surface shape of the protective layer without using a soft material for the protective layer. Furthermore, transfer sheets have problems in that, when a film thickness of a protective layer is increased to enhance the softness even in the case where a soft material is used for the protective layer, cuttability of the transfer layer is deteriorated, and excessive transfer layer remains around the resin molded article after the transfer, which is so-called foil burr.

SUMMARY

The present technology provides a transfer sheet and a decorative sheet that can impart a smooth and soft tactile impression. Furthermore, the present technology provides a transfer sheet that is less likely to cause foil burrs. Furthermore, the present technology provides a decorative article that has a smooth and soft tactile impression.

Some aspects of the present technology are described below. These aspects can be combined optionally, as needed.

The transfer sheet of an embodiment of the present technology is
a transfer sheet having at least a release layer, a protective layer, and an adhesive layer laminated in this order on a base sheet, the release layer containing particles and having a surface roughness Ra of 0.15 to 1.0 µm, the protective layer containing an ionizing radiation-curable urethane resin and having a Martens hardness of 2.0 to 40.0 N/mm$^2$, and the adhesive layer containing an acrylic resin.

The thickness of the protective layer is preferably from 5 to 50 µm.

The decorative article of an embodiment of the present technology includes a resin molded article and the transfer sheet described above fixed on the resin molded article by the adhesive layer, the base sheet of the transfer sheet being peeled off.

The decorative sheet of an embodiment of the present technology includes a support sheet and the transfer sheet described above fixed on the support sheet by the adhesive layer, the base sheet of the transfer sheet being peeled off.

The decorative article of an embodiment of the present technology includes a resin molded article and the decorative sheet described above fixed on the resin molded article, the support sheet of the decorative sheet facing the resin molded article.

The transfer sheet of an embodiment of the present technology includes at least a release layer, a protective layer, and an adhesive layer laminated on a base sheet, the release layer containing particles and having a surface roughness Ra of 0.15 to 1.0 µm, the protective layer containing an ionizing radiation-curable urethane resin and having a Martens hardness of 2.0 to 40.0 N/mm$^2$, and the adhesive layer containing an acrylic resin. Therefore, the transfer sheet of an embodiment of the present technology can impart a smooth and soft tactile impression and is less likely to cause foil burrs.

The decorative article of an embodiment of the present technology includes a resin molded article and the transfer sheet described above fixed on the resin molded article by the adhesive layer, the base sheet of the transfer sheet being peeled off. Therefore, the decorative article of an embodiment of the present technology has a smooth and soft tactile impression.

The decorative sheet of an embodiment of the present technology includes a support sheet and the transfer sheet described above fixed on the support sheet by the adhesive layer, and the base sheet of the transfer sheet is peeled off. Therefore, the decorative sheet of an embodiment of the present technology can impart a smooth and soft tactile impression.

The decorative article of an embodiment of the present technology includes a resin molded article and the decorative sheet described above fixed on the resin molded article, and the support sheet of the decorative sheet faces the resin molded article. Therefore, the decorative article of an embodiment of the present technology has a smooth and soft tactile impression.

BRIEF DESCRIPTION OF DRAWINGS

FIGS. 3A to 3D are cross-sectional views illustrating an example of a method of producing a transfer sheet of an embodiment of the present technology.

FIG. 4B is an A-A cross-sectional view of FIG. 4A.

FIG. 9B is an A-A cross-sectional view of FIG. 9A.

DETAILED DESCRIPTION

An example of embodiments of the transfer sheet of the present technology is described below.

Figure 1:
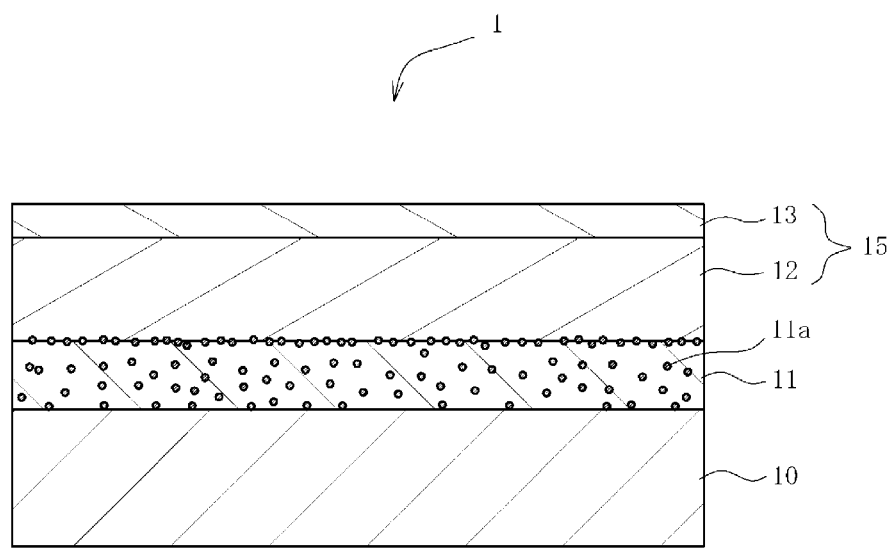
FIG. 1 is a cross-sectional view illustrating an example of a transfer sheet of an embodiment of the present technology.

The transfer sheet of an embodiment of the present technology is a transfer sheet 1 including at least a release layer 11, a protective layer 12, and an adhesive layer 13 laminated on a base sheet 10, the release layer 11 containing particles 11a and having a surface roughness Ra of 0.15 to 1.0 μm, the protective layer 12 containing an ionizing radiation-curable urethane resin and having a Martens hardness of 2.0 to 40.0 N/mm², and the adhesive layer 13 containing an acrylic resin (see FIG. 1).

The material of the base sheet 10 is not limited, and examples thereof include thermoplastic resins, such as polypropylene resins, polyethylene resins, polyamide resins, acrylic resins, olefin resins, polyester resins, vinyl chloride resins, polycarbonate resins, and ABS (acrylonitrile butadiene styrene) resins, and laminated products of these. The thickness of the base sheet 10 may be from 20 μm to 600 μm.

The release layer 11 is formed to enhance releasability of the base sheet 10 and is peeled off together with the base sheet 10 when the base sheet 10 is peeled off. As the release layer 11, melamine resins, epoxy resins, silicon resins, fluorine resins, cellulose resins, resins in which paraffin is mixed, or the like can be used. One type of these resins may be used alone, or a combination of two or more types of these resins may be used. In the release layer 11, the resin constituting the release layer contains the particles 11a. As the particles 11a, organic beads of urethane resins, acrylic resins, or the like, and/or inorganic particles of silica or the like can be used. By allowing the particles 11a to be dispersed in the resin constituting the release layer, the surface roughness Ra of the release layer 11 becomes from 0.15 to 1.0 μm. Note that the surface roughness Ra is an arithmetic mean roughness. When the transfer layer 15 is transferred onto the object to be transferred 2, the recesses and protrusions corresponding to the shape of the particles 11a can be formed on the protective layer 12 (see FIGS. 2A and 2B). That is, the surface roughness Ra of the protective layer 12 and the surface roughness Ra of the release layer 11 are the same values. A smooth tactile impression without projections can be felt when the protective layer is actually touched by a hand due to the surface roughness Ra set to the range described above.

Figure 2A:
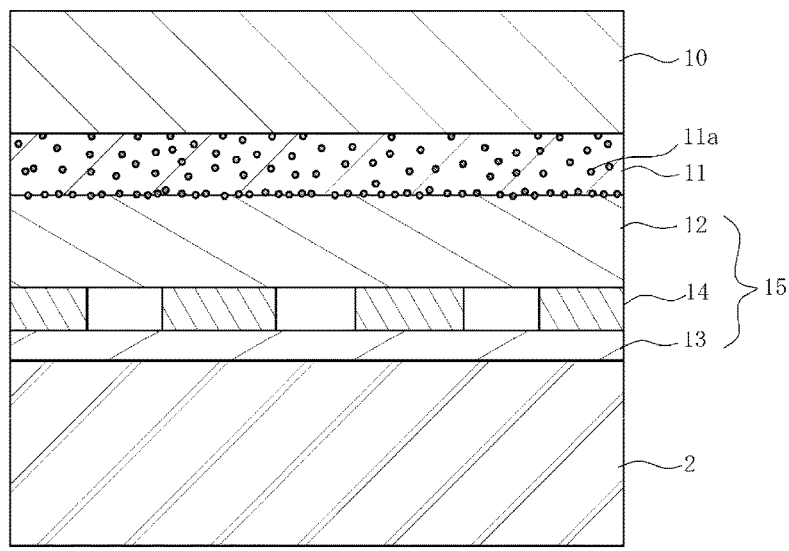
FIG. 2A is a cross-sectional view illustrating a condition where a transfer sheet of an embodiment of the present technology is adhered to an object to be transferred.
Figure 2B:
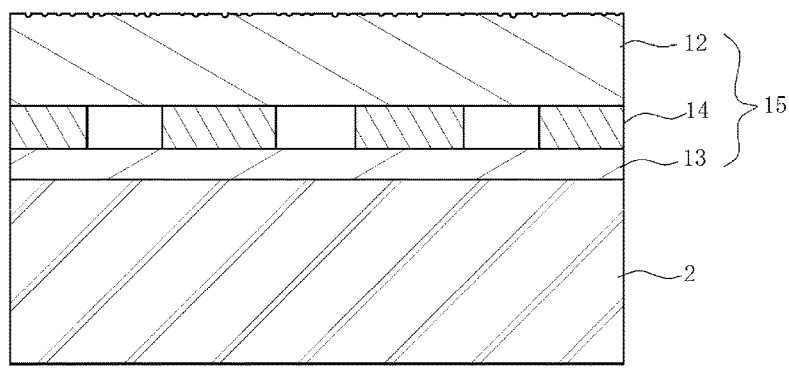
FIG. 2B is a cross-sectional view illustrating a condition where a transfer layer is transferred to the object to be transferred.

The protective layer 12 is an outermost layer of the object to be transferred 2 after the transfer layer 15 is transferred to the object to be transferred 2 and the base sheet 10 is removed (see FIG. 2B). The protective layer 12 can impart durability, abrasion resistance, chemical resistance, and the like to the object to be transferred 2. The protective layer 12 is formed from a urethane resin of ionizing radiation-curable resin. As the ionizing radiation, any of ultraviolet light, electron beam, or radiation is used. The Martens hardness of the protective layer 12 is from 2.0 to 40.0 N/mm². The Martens hardness is a hardness measured in the condition where a test load is applied and is determined from the value of an indentation load-indentation depth curve. A soft tactile impression can be felt when the protective layer is actually touched by a hand due to the protective layer 12 formed from a urethane resin having a flexibility by the Martens hardness within the range described above. The protective layer of the transfer sheet of an embodiment of the present technology is softer than protective layers of known transfer sheets and can reproduce the same degree of softness achieved by coated films by coating.

The transfer sheet 1 can impart a smooth tactile impression to the object to be transferred 2 due to the surface roughness Ra of the release layer 11 and can impart a soft tactile impression to the object to be transferred 2 due to the Martens hardness of the protective layer 12. The transfer sheet 1 of an embodiment of the present technology can impart a smooth and soft tactile impression to an object to be transferred while the transfer sheet 1 has a hardness sufficient to tolerate scratches, abrasions, and the like.

The adhesive layer 13 is a layer formed to enhance the degree of adhesion of a transfer layer 15 to an object to be transferred 2 when the transfer layer 15 is transferred to the object to be transferred 2. The material of the adhesive layer 13 contains an acrylic resin that is thermosensitive or pressure-sensitive. Because an acrylic resin is harder than other resins, the adhesive layer 13 tends to be broken when the base sheet 10 is peeled off from the transfer layer 15. The transfer layer 15 is cut from this breakage and peeled off cleanly from the base sheet 10. That is, when an acrylic resin is used as the adhesive layer 13, cuttability of the transfer layer 15 is enhanced, and foil burrs are less likely to occur.

Note that the transfer layer 15 may have a design layer 14 (see FIGS. 2A and 2B). The design layer 14 can be formed with an ink-like substance in which a pigment, a dye, and the like are mixed with a solvent. The design layer 14 may be formed on one face of the adhesive layer 13 or may be formed as a pattern. Furthermore, besides the design layer 14, a metal thin film layer and/or an anchor layer to enhance the adhesion between layers may be provided.

Furthermore, another preferable aspect is a transfer sheet 1 in which the thickness of the protective layer 12 is from 5 to 50 μm. The thickness is more preferably from 15 to 25 μm. The object to be transferred 2 is typically harder than the transfer sheet 1. Thus, when it is attempted to impart a soft tactile impression to the object to be transferred 2, the protective layer 12, which is the outermost face after the transfer, needs to have a greater thickness. However, when the thickness is excessively great, it becomes difficult to cut the protective layer 12 when the base sheet 10 is peeled off, and foil burrs occur more easily. When the thickness of the protective layer 12 is within the range described above, foil burrs are less likely to occur due to the excellent cuttability of the protective layer 12, and a soft tactile impression can be imparted to the object to be transferred 2.

An example of the method of producing the transfer sheet 1 is described below.

Figure 3A:
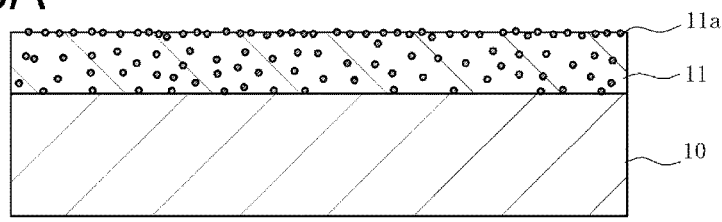

First, particles 11a are mixed in a resin constituting a release layer. As the particles 11a, organic beads of urethane resins, acrylic resins, or the like, and/or inorganic particles of silica or the like can be used. As the resin constituting the release layer 11, melamine resins, epoxy resins, silicon resins, fluorine resins, cellulose resins, resins in which paraffin is mixed, or the like can be used. One type of these resins may be used alone, or a combination of two or more types of these resins may be used. An ink-like mixture is obtained by mixing the resin, the particles 11a, and an organic solvent. This mixture is laminated on a base sheet 10 to form a release layer 11 (see FIG. 3A). As the method of forming the release layer 11, use of a typical printing method, such as a gravure printing method, a screen printing method, or an offset printing method, or a coating method, such as a gravure coating method, a roll coating method, or a die coating method, is preferable. For example, when the content and the average particle size of the particles 11a are set to predetermined ranges, the particles 11a tend to be localized on the surface of the release layer 11, and thus recesses and protrusions, by which a smooth tactile impression can be felt when touched by a hand, can be imparted to the surface of the release layer 11 after the transfer.

Figure 3B:
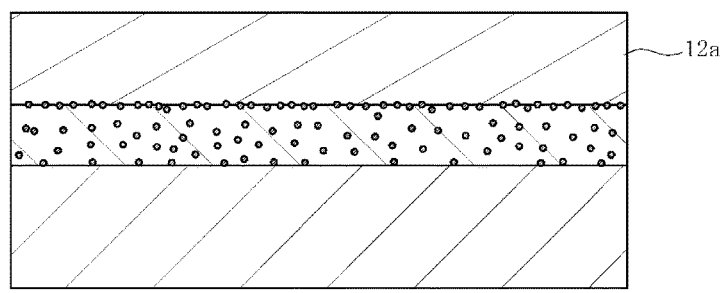
Figure 3B:
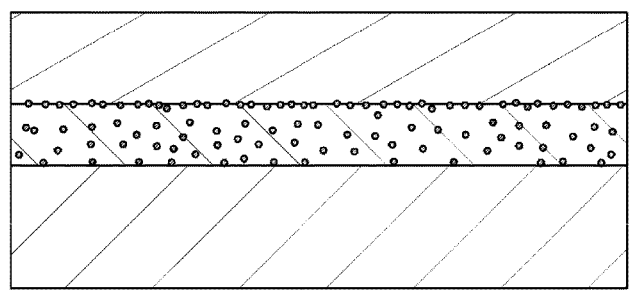

Thereafter, the urethane resin 12a is laminated on the release layer 11 (see FIG. 3B), and then, a protective layer 12 is formed by irradiating the laminate with ionizing radiation (see FIG. 3C). The urethane resin 12a is mixed with an organic solvent or the like to form into an ink-like form. The urethane resin 12a is preferably laminated by using a typical printing method, such as a gravure printing method, a screen printing method, or an offset printing method, or a coating method, such as a gravure coating method, a roll coating method, or a die coating method. As the ionizing radiation, any of ultraviolet light, electron beam, or radiation can be used, and the ionizing radiation is preferably ultraviolet light. The surface physical properties, such as scratch resistance, abrasion resistance, and chemical resistance, of the protective layer 12 can be enhanced by curing the urethane resin 12a by irradiation with ionizing radiation before the entire transfer layer 15 is formed. Furthermore, because the protective layer 12 which is the outermost layer after the transfer is formed by using the urethane resin 12a, a soft tactile impression can be felt when the object to be transferred 2 is touched by a hand.

Figure 3D:
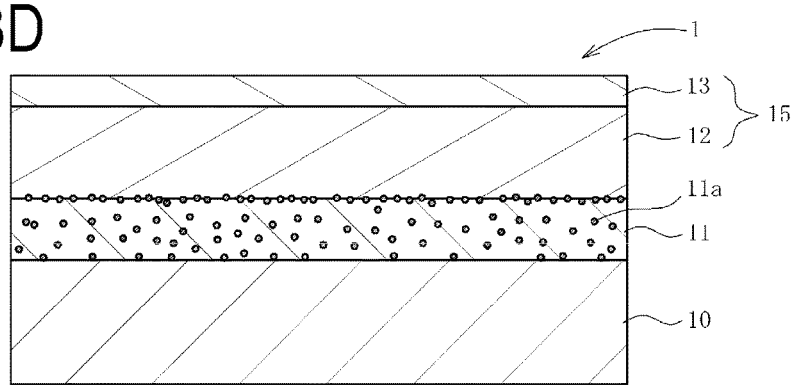

Thereafter, a resin containing an acrylic resin is laminated on the protective layer 12 to form an adhesive layer 13 (see FIG. 3D). An acrylic resin having thermosensitivity or pressure sensitivity is preferable. When an acrylic resin that is harder than other resins is used, the adhesive layer 13 tends to be broken when the base sheet 10 is peeled off from the transfer layer 15. The transfer layer 15 is cut from this breakage and peeled off cleanly from the base sheet 10. That is, when an acrylic resin is used as the adhesive layer 13, cuttability of the transfer layer 15 is enhanced, and foil burrs are less likely to occur. As the method of forming the adhesive layer 13, use of a typical printing method, such as a gravure printing method, a screen printing method, or an offset printing method, or a coating method, such as a gravure coating method, a roll coating method, or a die coating method, is preferable.

Furthermore, besides the layers described above, steps of forming a design layer 14, a metal thin film layer, and/or an anchor layer to enhance the adhesion between layers may be performed. As the method of forming these, use of a typical printing method, such as a gravure printing method, a screen printing method, or an offset printing method, or a coating method, such as a gravure coating method, a roll coating method, or a die coating method, is preferable.

Note that the drying temperature during the formation of each of the layers described above may be, for example, from 50° C. to 200° C.

An example of embodiments of the decorative article of the present technology is described below.

Figure 4A:
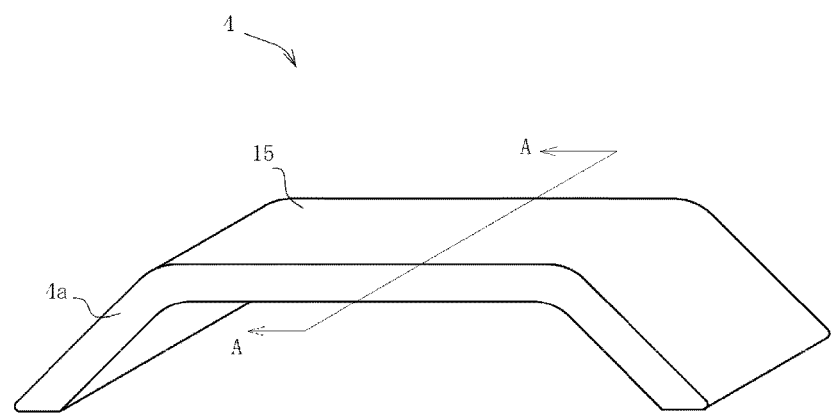
FIG. 4A is a perspective view illustrating an example of a decorative article of an embodiment of the present technology.
Figure 4A:
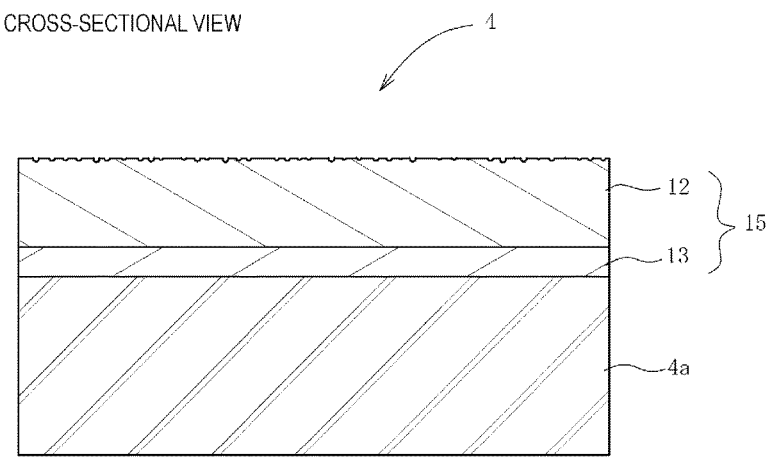

The decorative article of an embodiment of the present technology includes a resin molded article 4a and the transfer sheet 1 described above fixed on the resin molded article 4a by an adhesive layer 13, and the base sheet 10 of the transfer sheet is peeled off (see FIGS. 4A and 4B).

Examples of the material of the resin molded article 4a include general purpose resins, such as polystyrene resins, polyolefin resins, ABS resins, AS resins, and AN resins, general purpose engineering resins, such as polyphenylene oxide-polystyrene resins, polycarbonate resins, polyacetal resins, acrylic resins, polycarbonate-modified polyphenylene ether resins, polybutylene terephthalate resins, and ultrahigh molecular weight polyethylene resins, super engineering resins, such as polysulfone resins, polyphenylene sulfide resins, polyphenylene oxide resins, polyarylate resins, polyether imide resins, polyimide resins, liquid crystal polyester resins, and polyallyl heat-resistant resins, composite resins in which a reinforcing material such as glass fibers and inorganic fillers is added.

On the resin molded article 4a, a transfer layer 15 formed from an adhesive layer 13 and a protective layer 12 is formed (see FIG. 4B). The adhesive layer 13 contains an acrylic resin and preferably has thermosensitivity or pressure sensitivity. The protective layer 12 is formed from an ionizing radiation-curable urethane resin, and the surface roughness Ra of the protective layer 12 is from 0.15 to 1.0 μm and the Martens hardness is from 2.0 to 40.0 N/mm². Because the protective layer 12 is formed by using the urethane resin, a soft tactile impression can be felt when the decorative article 4 is touched by a hand. Furthermore, by setting the Martens hardness and the surface roughness Ra of the protective layer 12 to the range described above, a smooth tactile impression can be felt when the decorative article 4 is touched by a hand, and the decorative article 4 having a hardness sufficient to tolerate scratches, abrasions, and the like can be obtained.

Note that the transfer layer 15 may contain a design layer, a metal thin film layer, and/or an anchor layer to enhance the adhesion between layers.

An example of the method of producing the decorative article 4 is described below.

Figure 5A:
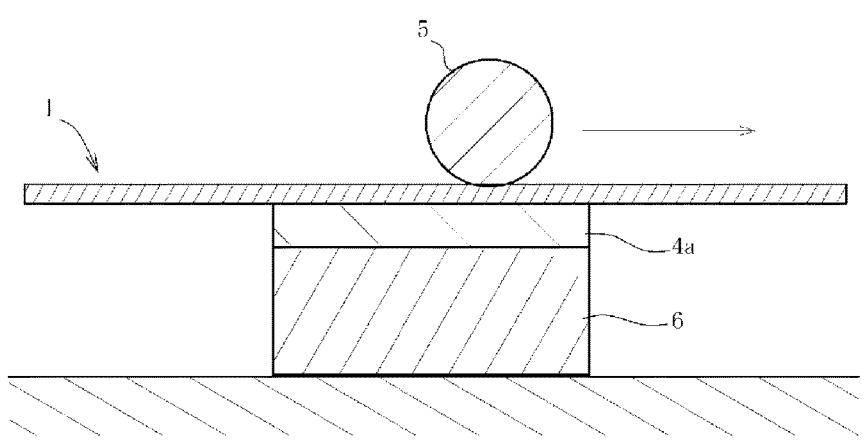
FIGS. 5A and 5B are cross-sectional views illustrating an example of a method of producing a decorative article of an embodiment of the present technology.

First, the transfer sheet 1 of an embodiment of the present technology is placed on a resin molded article 4a placed on a jig 6, and the transfer sheet 1 is pressed against the resin molded article 4a by using a heated roll 5 (see FIG. 5A). At this time, the transfer sheet 1 is placed such that the adhesive layer 13 faces the resin molded article 4a. The roll 5 or the jig 6 is moved while heat and pressure are applied to the roll 5. By this, the adhesive layer 13 is melted, and the resin molded article 4a and the transfer sheet 1 are adhered.

Figure 5B:
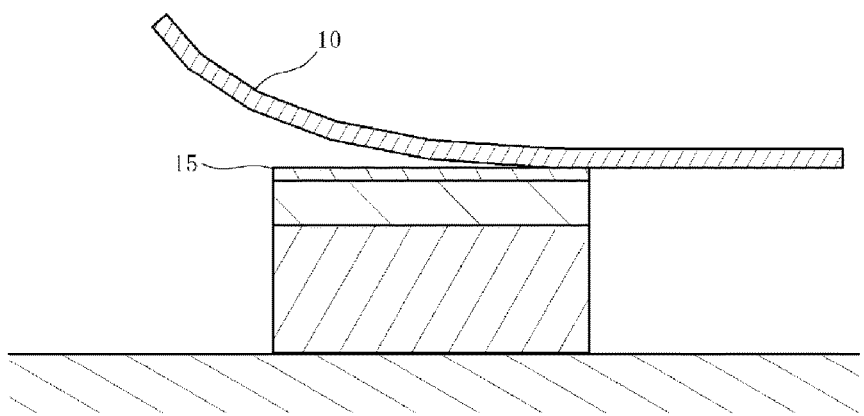

Thereafter, the base sheet 10 is peeled off (see FIG. 5B). At this time, the release layer 11 is peeled off at the same time. By this, the transfer is completed.

Another example of the method of producing the decorative article 4 is described below.

Figure 6A:
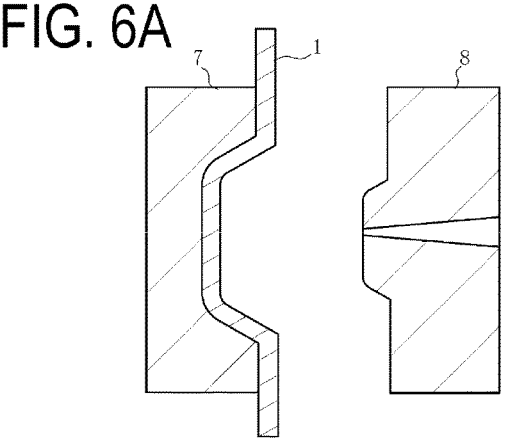
FIGS. 6A to 6E are cross-sectional views illustrating another example of a method of producing a decorative article of an embodiment of the present technology.

The transfer sheet 1 of an embodiment of the present technology is placed on a molding face of the movable mold 7 (see FIG. 6A). A vacuum hole is preferably provided on the molding face of the movable mold 7 (not illustrated). By this, the air in between the movable mold 7 and the transfer sheet 1 is suctioned through the vacuum hole, and the transfer sheet 1 can be adhered to the molding face of the movable mold 7. The transfer sheet 1 can be supplied to the mold by using equipment that sends the transfer sheet 1 having a long size to the molding face. The description above can be applied to the case where the transfer sheet 1 is placed on a molding face of a fixed mold 8. The vacuum hole may be formed in a slit shape on the outer periphery of the molding face such that no traces are left on the transfer sheet 1.

Figure 6D:
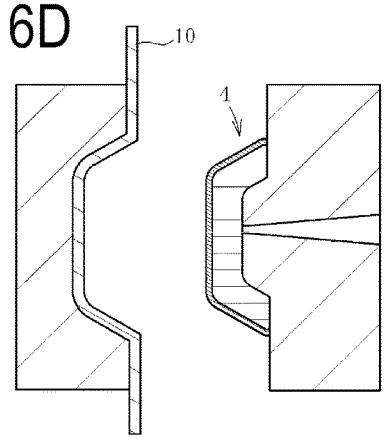
Figure 6B:
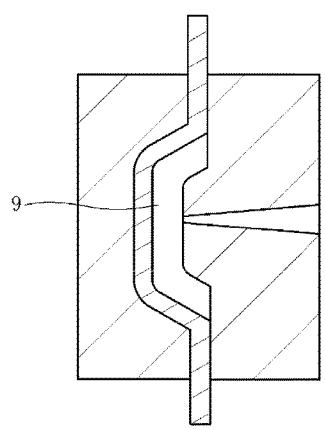

Thereafter, the movable mold 7 and the fixed mold 8 are closed (see FIG. 6B). At this time, a cavity 9 is formed in between the movable mold 7 and the fixed mold 8.

Figure 6E:
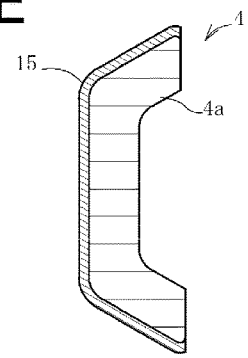
Figure 6C:
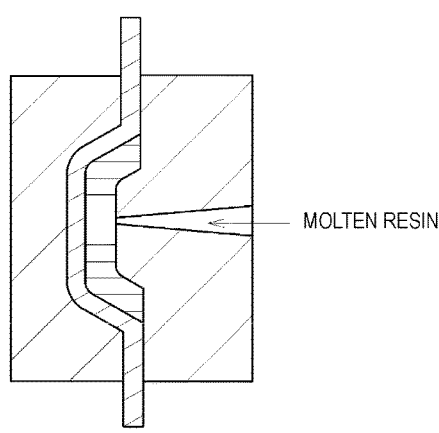

Thereafter, a molten resin is injected in the cavity 9 (see FIG. 6C). The injected molten resin is integrally molded with the transfer sheet 1. As the resin, general purpose resins, such as polystyrene resins, polyolefin resins, ABS resins, AS resins, and AN resins, general purpose engineering resins, such as polyphenylene oxide-polystyrene resins, polycarbonate resins, polyacetal resins, acrylic resins, polycarbonate-modified polyphenylene ether resins, polybutylene terephthalate resins, and ultrahigh molecular weight polyethylene resins, super engineering resins, such as polysulfone resins, polyphenylene sulfide resins, polyphenylene oxide resins, polyarylate resins, polyether imide resins, polyimide resins, liquid crystal polyester resins, and polyallyl heat-resistant resins, and composite resins in which a reinforcing material such as glass fibers and inorganic fillers is added can be used.

Thereafter, the molds are opened (see FIG. 6D). At this time, the base sheet 10 of the transfer sheet 1 is peeled off from the transfer layer 15.

Finally, a decorative article 4 in which the resin molded article 4a and the transfer layer 15 are integrally molded is taken out from the mold (see FIG. 6E).

In the examples of the two production methods described above, when the thickness of the protective layer 12 of the transfer sheet 1 is from 5 to 50 μm, or more preferably from 15 to 25 μm, foil burrs are less likely to occur because the cuttability of the protective layer 12 during the peeling of the base sheet 10 is excellent, and the decorative article 4 by which a smooth and soft tactile impression can be felt when the decorative article 4 is touched by a hand can be obtained.

An example of embodiments of the decorative sheet of the present technology is described below.

Figure 7A:
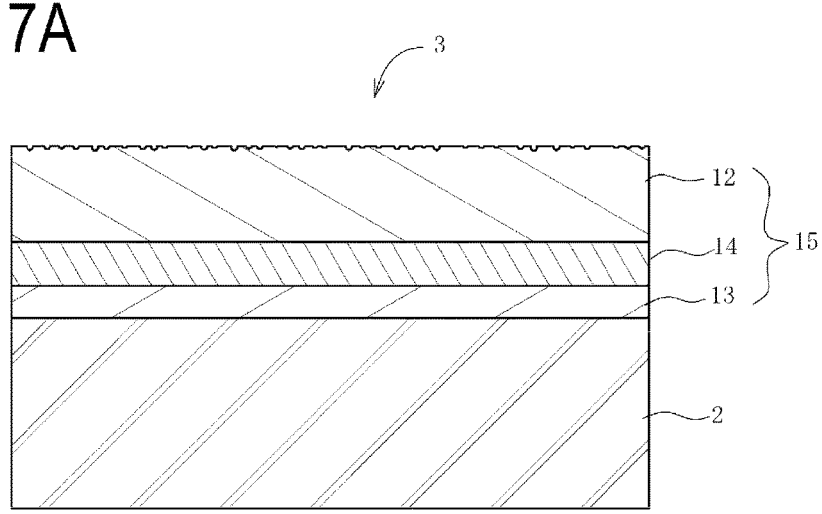
FIGS. 7A and 7B are cross-sectional views illustrating an example of a decorative sheet of an embodiment of the present technology.
Figure 7B:
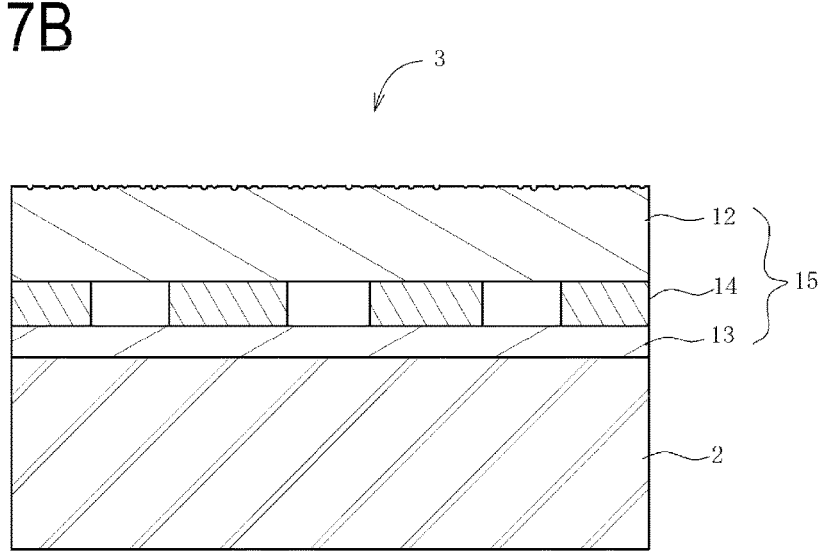

The decorative sheet 30 of an embodiment of the present technology includes a support sheet 20 and the transfer sheet 1 described above fixed on the support sheet 20 by an adhesive layer 13, and the base sheet 10 of the transfer sheet is peeled off (see FIGS. 7A and 7B).

The material of the support sheet 20 is not limited and, for example, the same material as the base sheet 10 can be used. The thickness of the support sheet 20 may be from 100 to 600 μm.

The adhesive layer 13 is a layer formed to enhance the degree of adhesion of the transfer layer 15 to the support sheet 20 when the transfer layer 15 is transferred to the object to be transferred 2. As the material of the adhesive layer 13, a resin that is thermosensitive or pressure-sensitive is used. For example, resins, such as acrylic, polystyrene-based, polyamide-based, polyolefin-based, and vinyl chloride-vinyl acetate copolymers, can be used.

The protective layer 12 is a layer that is the outermost surface of the decorative sheet 30 (see FIGS. 7A and 7B). The protective layer 12 can impart durability, abrasion resistance, chemical resistance, and the like to the object to be decorated. The protective layer 12 is formed from a urethane resin of ionizing radiation-curable resin. As the ionizing radiation, any of ultraviolet light, electron beam, or radiation is used. Ultraviolet light is preferable. The surface roughness Ra of the protective layer 12 is from 0.15 to 1.0 μm, and the Martens hardness is from 2.0 to 40.0 N/mm². A smooth tactile impression without projections can be felt when the protective layer is actually touched by a hand due to the surface roughness Ra set to the range described above. Furthermore, a soft tactile impression can be felt when the protective layer is actually touched by a hand due to the Martens hardness within the range described above.

The decorative sheet 30 can impart a smooth tactile impression to the object to be transferred 20 by the surface roughness Ra of the protective layer 12 and can impart a soft tactile impression to the object to be transferred 20 due to the Martens hardness of the protective layer 12. The decorative sheet 30 of an embodiment of the present technology can impart a smooth and soft tactile impression to an object to be transferred while the decorative sheet 30 has a hardness sufficient to tolerate scratches, abrasions, and the like.

Furthermore, another preferable aspect is a decorative sheet 30 in which the thickness of the protective layer 12 is from 5 to 50 μm. The thickness is more preferably from 15 to 25 μm. The object to be decorated is typically harder than the transfer sheet 1. However, when the thickness of the protective layer 12 is within the range described above, a decorative article by which a soft tactile impression can be felt when the decorative article is touched by a hand regardless of the hardness of the object to be decorated can be obtained. An example of the method of producing the decorative sheet is described below.

Figure 8A:
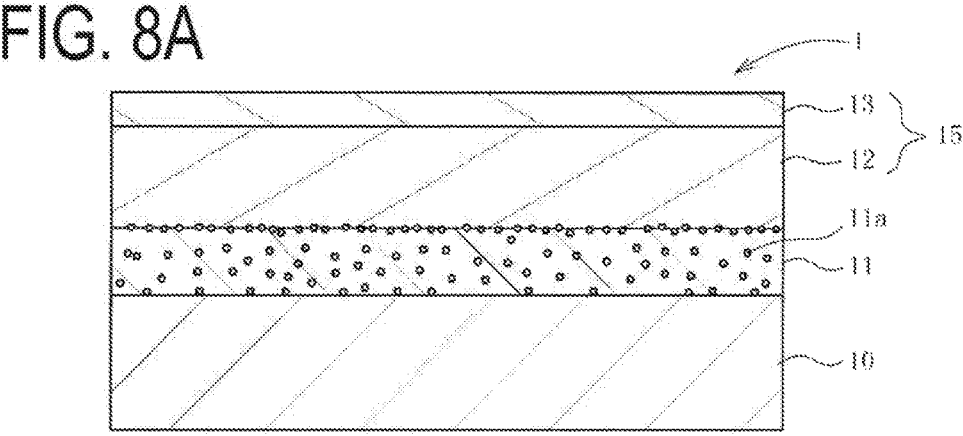
FIGS. 8A to 8C are cross-sectional views illustrating an example of a method of producing a decorative sheet of an embodiment of the present technology.

First, a transfer sheet 1 in which a release layer 11 containing particles 11a, a protective layer 12, and an adhesive layer 13 are laminated in this order on a base sheet 10 is prepared (see FIG. 8A).

Figure 8B:
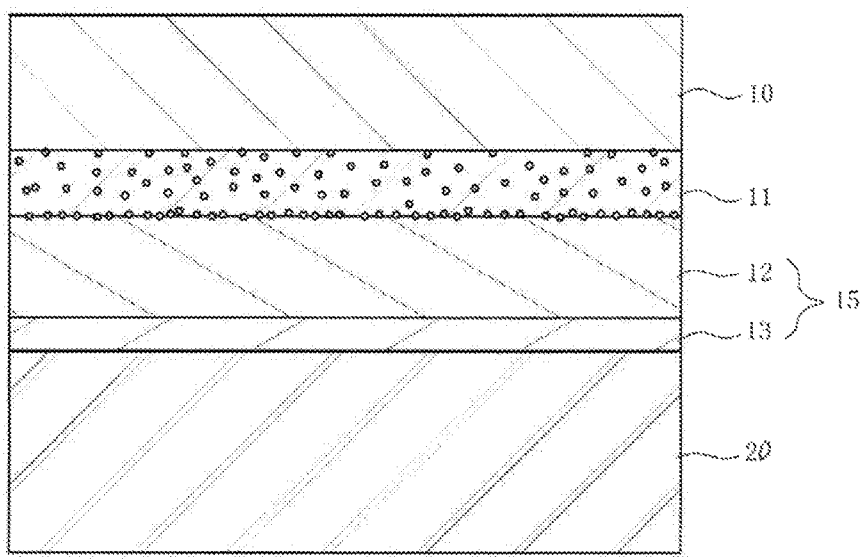

The transfer sheet 1 and the support sheet 20 are then adhered (see FIG. 8B).

When the transfer sheet 1 and the support sheet 20 are adhered, adhesion is performed while heat and pressure are applied. During the adhesion, a laminator or the like may be used.

Figure 8C:
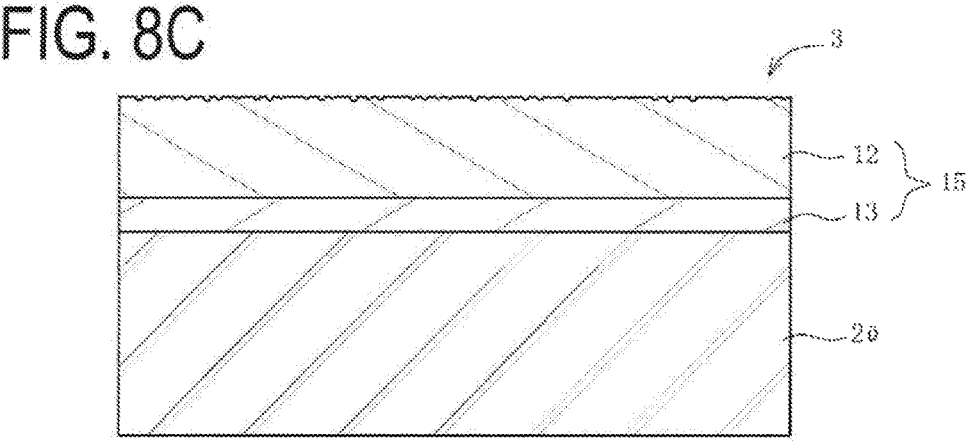

The release layer 11 of the transfer sheet 1 is peeled off together with the base sheet 10 from the protective layer 12 to transfer the transfer layer 15 including the adhesive layer 13 and the protective layer 12 onto the support sheet 20 (see FIG. 8C).

An example of embodiments of the decorative article of the present technology is described below.

Figure 9A:
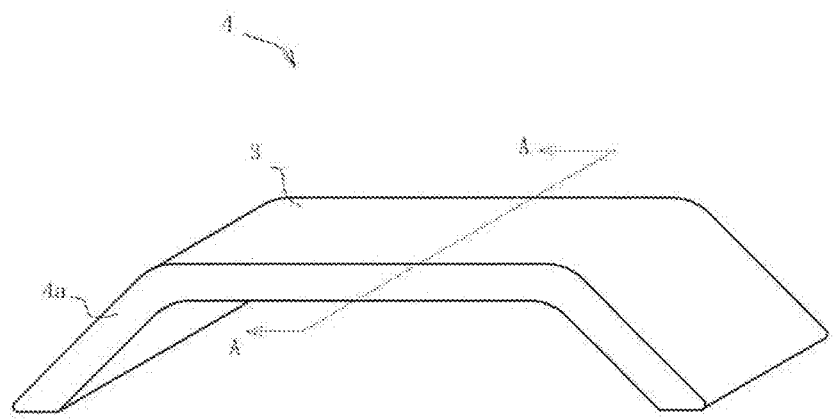
FIG. 9A is a perspective view illustrating an example of a decorative article of an embodiment of the present technology.
Figure 9A:
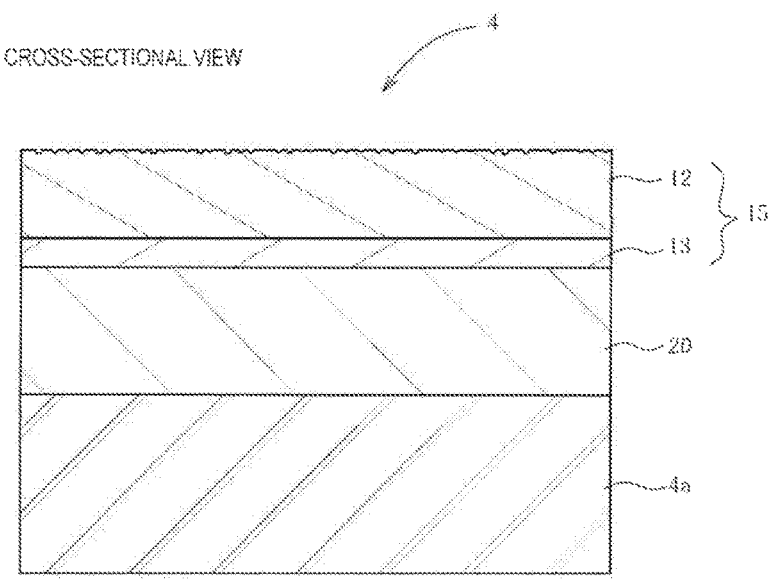

The decorative article 4 of an embodiment of the present technology includes a resin molded article 4a and the decorative sheet 30 described above fixed on the resin molded article 4a, and the support sheet 20 of the decorative sheet faces the resin molded article 4a (see FIGS. 9A and 9B).

A support sheet 20 and a transfer layer 15 including an adhesive layer 13 and a protective layer 12 are formed on the resin molded article 4a (see FIG. 9B). The protective layer 12 is formed from an ionizing radiation-curable urethane resin, and the surface roughness Ra of the protective layer 12 is from 0.15 to 1.0 μm and the Martens hardness is from 2.0 to 40.0 N/mm².

Because the protective layer 12 is formed by using the urethane resin, a soft tactile impression can be felt when touching the decorative article 4 by a hand. Furthermore, by setting the Martens hardness and the surface roughness Ra of the protective layer 12 to the range described above, a smooth tactile impression can be felt when touching the decorative article 4 by a hand, and a decorative article 4 having a hardness sufficient to tolerate scratches, abrasions, and the like can be obtained.

An example of the method of producing the decorative article 4 is described below.

Figure 10A:
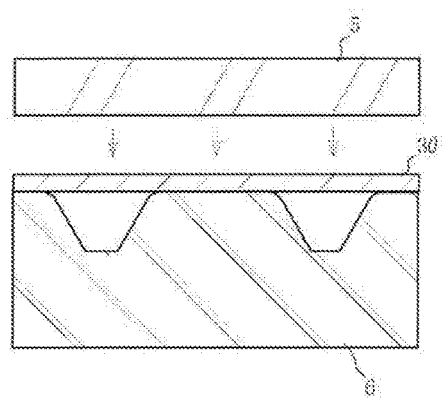
FIGS. 10A to 10F are cross-sectional views illustrating an example of a method of producing a decorative article of an embodiment of the present technology.
Figure 10D:
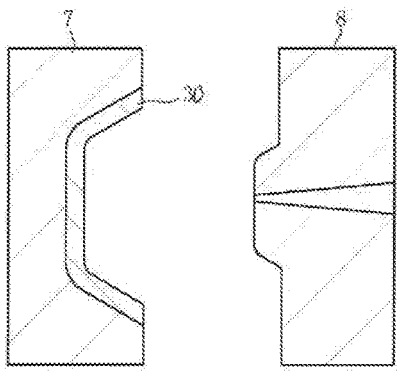
Figure 10B:
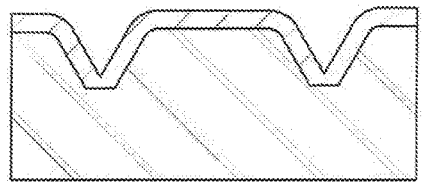
Figure 10E:
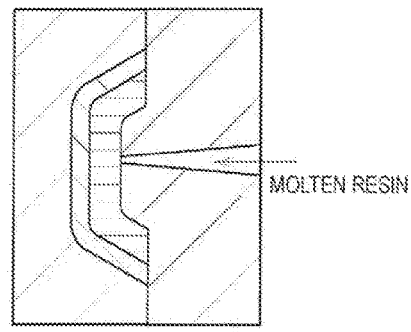
Figure 10C:
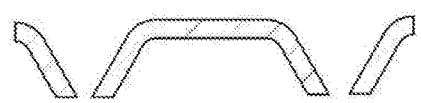
Figure 10F:
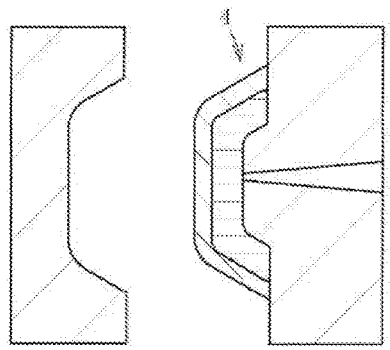

First, a decorative sheet 30 is placed on a jig 6 and is pre-heated by using a heat source 50 (see FIG. 10A). As the heat source 50, an infrared heater, an electric heater, high frequency induction, a halogen lamp, microwave, and high temperature inductor such as steam, and laser may be used. The temperature of the heat applied to the decorative sheet 3 by the heat source 50 may be from 100 to 250° C. Thereafter, the decorative sheet 30 softened by the heating is adhered to the jig 6 to mold (see FIG. 10B). As a method of adhering, a method by which the air in between the decorative sheet 30 and the jig 6 is suctioned through a vacuum hole provided on the jig 6 can be used. Alternatively, a method of adhering the decorative sheet 30 to the jig 6 by sending compressed air from above in the figure can be used. Thereafter, an unnecessary portion of the decorative sheet 30 is trimmed (see FIG. 10C). By this, the decorative sheet 30 that is molded on the outer shape of the decorative article can be obtained. The trimmed decorative sheet 30 is placed in a molding face of a movable mold 7, and the decorative sheet 30 is fixed by a vacuum hole provided on the movable mold or the like (see FIG. 10D). Thereafter, the movable mold 7 and the fixed mold 8 are closed, and a molten resin is injected into a cavity (see FIG. 10E). As the molten resin, the same resin as the resin molded article 4a described above can be used. The mold is opened (see FIG. 10F), and a decorative article 4 in which the decorative sheet 30 and the resin molded article 4a are formed as a single body is taken out.

Another example of the method of producing the decorative article 4 is described.

Figure 11A:
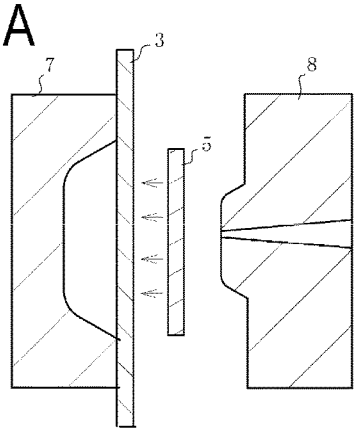
FIGS. 11A to 11E are cross-sectional views illustrating another example of a method of producing a decorative article of an embodiment of the present technology.
Figure 11D:
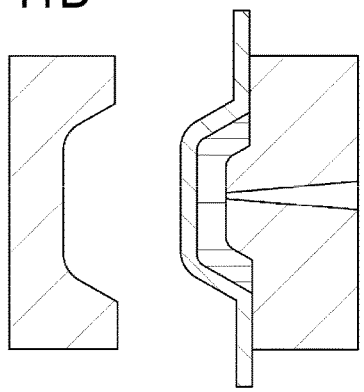
Figure 11B:
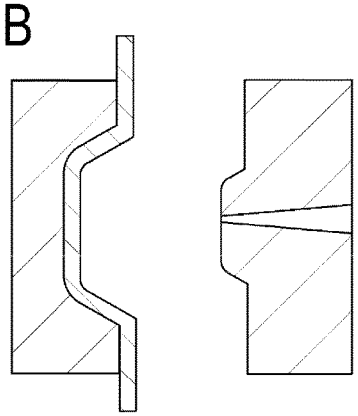
Figure 11E:
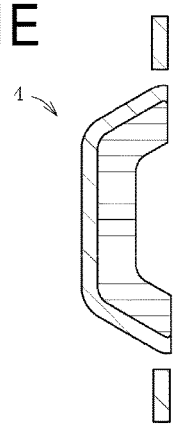
Figure 11C:
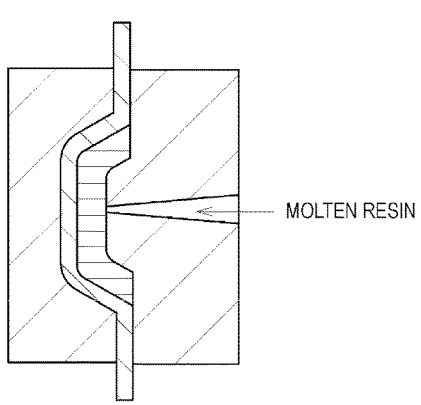

First, a decorative sheet 30 is placed on a molding face of a movable mold 7 and is pre-heated by using a heat source 50 (see FIG. 11A). The temperature of the heat source 50 and the temperature applied to the decorative sheet 30 may be the same as those for the production method described above. Thereafter, the decorative sheet 30 softened by the heating is adhered to the molding face of the movable mold 7 to mold (see FIG. 11B). As a method of adhering, a method by which the air in between the decorative sheet 30 and the molding face is suctioned through a vacuum hole provided on the movable mold 7 can be used. Thereafter, the movable mold 7 and the fixed mold 8 are closed, and a molten resin is injected into a cavity (see FIG. 11C). As the molten resin, the same resin as the resin molded article 4a described above can be used. The mold is opened (see FIG. 11D), and a molded article in which the decorative sheet 30 and the resin molded article 4a are formed as a single body is taken out. Then, an unnecessary portion of the decorative sheet 30 is trimmed to obtain a decorative article 4.

As described above, the decorative article 4 of an embodiment of the present technology can be obtained. The decorative article 4 of an embodiment of the present technology has a smooth and soft tactile impression when the decorative article is touched by a hand. Furthermore, in the decorative sheet 30 of an embodiment of the present technology, because the protective layer 12 of the decorative sheet 30 is cured, the surface shape of the protective layer 12 is less likely to be deformed by injection pressure or the like in the production method described above, and the tactile impression before the molding is less likely to change after the molding.

Examples 1 to 7 and Comparative Examples 1 to 5

First, a transfer sheet was produced by forming methods with the following constitution.

Base sheet: polyethylene terephthalate Thickness: 50 μm

Release layer: composition as shown in Table 1 and 2 Thickness: 2 to 5 μm

Formed by a coating method (applicator)

Protective layer: composition and thickness as shown in Table 1 and 2

Formed by a coating method (applicator)

Design layer: acrylic urethane resin Thickness: 2 to 5 μm

Formed by a gravure printing method

Adhesive layer: composition as shown in Table 1 and 2 Thickness: 2 to 4 μm

Formed by a gravure printing method

The transfer sheet described above was supplied in between a movable mold and a fixed mold, and the transfer sheet was placed such that the transfer sheet was in contact with the molding face of the movable mold. The mold was then closed, and an ABS resin was injected to integrally mold the transfer sheet and the molten resin. The mold was opened, and the base sheet was peeled off to obtain a decorative article.

For the decorative articles obtained in Examples 1 to 7 and Comparative Examples 1 to 5, the surface roughness Ra and the Martens hardness were measured.

The surface roughness Ra was measured by using a surface roughness measurement instrument (SURFCOM 1500 SD□12, available from Tokyo Seimitsu Co., Ltd.) in the following conditions: test speed: 0.3 mm/sec; measurement length: 10 mm; and analytical condition: condition of JIS-'01 standard.

The Martens hardness was measured by using a ultrafine indentation hardness tester EN-2100, available from Elionix Inc., in the following conditions.

Test mode: Load-unload test

Used indenter: Poisson's ratio=0.07 Modulus of elasticity=1140 GPa

Test force: 1.00 mN

Load speed: 0.015 mN/sec

Load retention time: 5 seconds

The tactile impression was evaluated comprehensively by using the surface roughness Ra and the Martens hardness. Furthermore, the presence or absence of foil burrs was evaluated. As the evaluation of the tactile impression, the case where a smooth and soft tactile impression was felt was evaluated as "Excellent", and the case where either one tactile impression of smoothness or softness was not felt was evaluated as "Poor". Furthermore, as the evaluation of the foil burrs, the case where no foil burrs were observed at all in the decorative article was evaluated as "Excellent", the case where foil burrs having the size that does not require a post-treatment were observed was evaluated as "Marginal", and the case where foil burrs having the size that requires a post-treatment were observed was evaluated as "Poor".

The results are shown in Table 1 and 2.

TABLE 1-1

| | | | Example 1 | Example 2 | Example 3 | Example 4 |
| --- | --- | --- | --- | --- | --- | --- |
| Release layer | Resin | | Melamine-based A | Melamine-based A | Melamine-based A | Melamine-based A |
| | Particle | Type | Silica | Silica | Silica | Silica |

TABLE 1-1-continued

|  |  | Example 1 | Example 2 | Example 3 | Example 4 |
|---|---|---|---|---|---|
| Protective layer | Resin | Urethane-based A | Urethane-based A | Urethane-based A | Urethane-based A |
|  | Dry film thickness | 22 | 20 | 16 | 7 |
| Adhesive layer | Resin | Acrylic A | Acrylic A | Acrylic A | Acrylic A |
| Surface roughness Ra (μm) |  | 0.4 | 0.7 | 0.7 | 0.7 |
| Martens hardness (N/mm$^2$) |  | 4.0 | 5.0 | 10.0 | 18.0 |
| Recoatability |  | Excellent | Excellent | Excellent | Excellent |
| Tactile impression evaluation |  | Excellent | Excellent | Excellent | Excellent |
| Foil burr evaluation |  | Excellent | Excellent | Excellent | Excellent |

TABLE 1-2

|  |  |  | Example 5 | Example 6 | Example 7 |
|---|---|---|---|---|---|
| Release layer | Resin |  | Melamine-based A | Melamine-based A | Melamine-based A |
|  | Particle | Type | Silica | Silica | Silica |
| Protective layer | Resin |  | Urethane-based A | Urethane-based C | Urethane-based A |
|  | Dry film thickness |  | 45 | 18 | 18 |
| Adhesive layer | Resin |  | Acrylic A | Acrylic A | Acrylic A |
| Surface roughness Ra (μm) |  |  | 0.7 | 0.7 | 0.2 |
| Martens hardness (N/mm$^2$) |  |  | 6.0 | 40.0 | 3.0 |
| Recoatability |  |  | Excellent | Excellent | Excellent |
| Tactile impression evaluation |  |  | Excellent | Excellent | Excellent |
| Foil burr evaluation |  |  | Excellent | Excellent | Excellent |

TABLE 2

|  |  | Comparative Example 1 | Comparative Example 2 | Comparative Example 3 | Comparative Example 4 | Comparative Example 5 |
|---|---|---|---|---|---|---|
| Release layer | Resin | Melamine-based A | Melamine-based A | Melamine-based A | Melamine-based A | Melamine-based A |
|  | Particle Type | Silica | Silica | Silica | Silica | Silica |
| Protective layer | Resin | Urethane-based A | Urethane-based A | Urethane-based A | Urethane-based A | Urethane-based B |
|  | Dry film thickness | 2 | 75 | 15 | 25 | 25 |
| Adhesive layer | Resin | Acrylic A | Acrylic A | Vinyl chloride-vinyl acetate-based A | Acrylic A | Acrylic A |
| Surface roughness Ra (μm) |  | 0.4 | 0.6 | 0.8 | 1.5 | 1.5 |
| Martens hardness (N/mm$^2$) |  | — | 7.0 | 8.0 | 4.5 | 170 |
| Recoatability |  | Poor | Excellent | Excellent | Excellent | Excellent |
| Tactile impression evaluation |  | Poor | Excellent | Excellent | Poor | Poor |
| Foil burr evaluation |  | Excellent | Marginal | Poor | Excellent | Excellent |

Note that the resins used for the protective layers were urethane resins A, B, and C, and the difference thereof was difference in crosslinking densities of the resins. A smaller crosslinking density indicates more flexibility, and the crosslinking densities becomes smaller in the order of the urethane resins B, C, and A. Furthermore, recoatability indicates that a smooth coated film of the protective layer can be formed without being affected by the recesses and protrusions of the release layer. When the recoatability is poor, the surface of the protective layer becomes so-called yuzu skin-like, or a portion where the protective layer is not formed appears, and thus the quality of the appearance of the decorative article is deteriorated. Due to the formation of a yuzu skin-like portion and/or a portion where the protective layer is not formed, the tactile impression of the decorative article is also affected.

As shown in Table 1, by the decorative articles of Examples 1 to 7 in which the surface roughness Ra was from 0.2 to 0.7 μm, the Martens hardness was from 3.0 to 40.0 N/mm$^2$, and the thickness of the protective layer was in a range of 7 to 45 μm, it was possible to feel smooth and soft tactile impressions when the decorative articles were touched by a hand. Furthermore, because the adhesive layers contained the acrylic resin, the decorative articles of Examples 1 to 7 exhibited excellent cuttability of the transfer layers and caused no foil burrs. Furthermore, the recoatability was excellent, and the quality of the appearance was excellent.

On the other hand, as shown in Table 2, the results for the decorative articles of Comparative Examples 1 to 5 were as follows.

In the decorative article of Comparative Example 1, because the thickness of the protective layer was 2 μm which was smaller than the recesses and protrusions of the release layer, the protective layer could not be formed on a portion of the release layer, and it was not possible to measure the Martens hardness. In the decorative article of Comparative Example 2, because the thickness of the protective layer was 75 μm which was great, the cuttability of the transfer layer was poor, and foil burrs were formed. In the decorative article of Comparative Example 3, because the adhesive layer was formed from the resin that did not contain an acrylic resin, the cuttability of the transfer layer including the adhesive layer was poor, and foil burrs were formed. In the decorative article of Comparative Example 4, the surface roughness Ra was 1.5 μm, and it was not possible to feel a smooth tactile impression. In the decorative article of Comparative Example 5, because the protective layer was formed from the urethane resin, which had the greatest crosslinking density, and because the surface roughness Ra was 1.5 μm, it was not possible to feel both smoothness and softness.

Examples 8 to 14 and Comparative Examples 6 to 9

First, a transfer sheet was produced by using forming methods with the following constitution.

Base sheet: biaxially stretched polyethylene terephthalate Thickness: 50 μm

Release layer: composition was as shown in Table 3 and 4 Thickness: 4 to 5 μm

Formed by a coating method (applicator)

Protective layer: composition and thickness as shown in Table 3 and 4

Formed by a coating method (applicator)

Design layer: acrylic urethane resin Thickness: 2 to 5 μm

Formed by a gravure printing method

Adhesive layer: composition as shown in Table 1 and 2 Thickness: 2 to 4 μm

Formed by a gravure printing method

The transfer sheet and the support sheet described above were adhered to each other by using a laminator, and the base sheet was peeled off to obtain a decorative sheet. As the support sheet, an ABS resin was used.

The decorative sheet described above was supplied in between a movable mold and a fixed mold, and the decorative sheet was placed such that the decorative sheet was in contact with the molding face of the movable mold. The decorative sheet was then heated by a heat source (Forming 480, available from Seikosangyo Co., Ltd.). Thereafter, the air between the decorative sheet and the molding face was suctioned through a vacuum hole of the movable mold to fix the decorative sheet. The mold was closed, and an ABS resin was injected into the cavity to integrally mold the decorative sheet and the molten resin. The mold was opened to obtain a decorative article.

For the decorative articles obtained in Examples 8 to 14 and Comparative Examples 6 to 9, the surface roughness Ra and the Martens hardness were measured in the same conditions as in Examples 1 to 7 and Comparative Examples 1 to 5. The evaluation method of the tactile impression was also the same as the evaluation method in Examples 1 to 7 and Comparative Examples 1 to 5. The results are shown in Table 3 and 4.

TABLE 3-1

|  |  |  | Example 8 | Example 9 | Example 10 | Example 11 |
|---|---|---|---|---|---|---|
| Release layer | Resin | | Melamine-based A | Melamine-based A | Melamine-based A | Melamine-based A |
| | Particle | Type | Silica | Silica | Silica | Silica |
| Protective layer | Resin | | Urethane-based A | Urethane-based A | Urethane-based A | Urethane-based A |
| | Dry film thickness | | 7 | 20 | 50 | 22 |
| Surface roughness Ra (μm) | | | 0.7 | 0.7 | 0.7 | 0.4 |
| Martens hardness (N/mm$^2$) | | | 6.0 | 5.5 | 5.5 | 4.0 |
| Recoatability evaluation | | | Excellent | Excellent | Excellent | Excellent |
| Tactile impression evaluation | | | Excellent | Excellent | Excellent | Excellent |
| Shape conformity evaluation | | | Excellent | Excellent | Excellent | Excellent |

TABLE 3-2

|  |  | Example 12 | Example 13 | Example 14 |
|---|---|---|---|---|
| Release layer | Resin | Melamine-based A | Melamine-based A | Melamine-based A |
| | Particle Type | Silica | Silica | Silica |
| Protective layer | Resin | Urethane-based A | Urethane-based C | Urethane-based A |
| | Dry film thickness | 7 | 18 | 18 |
| Surface roughness Ra (μm) | | 0.7 | 0.7 | 0.2 |
| Martens hardness (N/mm$^2$) | | 18.0 | 40.0 | 3.0 |
| Recoatability evaluation | | Excellent | Excellent | Excellent |
| Tactile impression evaluation | | Excellent | Excellent | Excellent |
| Shape conformity evaluation | | Excellent | Excellent | Excellent |

TABLE 4

|  |  | Comparative Example 6 | Comparative Example 7 | Comparative Example 8 | Comparative Example 9 |
|---|---|---|---|---|---|
| Release layer | Resin | Melamine-based A | Melamine-based A | Melamine-based A | Melamine-based A |
| | Particle Type | Silica | Silica | Silica | Silica |
| Protective layer | Resin | Urethane-based A | Urethane-based A | Urethane-based A | Urethane-based B |
| | Dry film thickness | 2 | 75 | 20 | 20 |
| Surface roughness Ra (μm) | | 0.4 | 0.6 | 1.5 | 0.6 |
| Martens hardness (N/mm$^2$) | | — | 7.0 | 4.0 | 170 |
| Recoatability evaluation | | Poor | Excellent | Excellent | Excellent |
| Tactile impression evaluation | | Poor | Poor | Poor | Poor |
| Shape conformity evaluation | | Poor | Poor | Excellent | Excellent |

Note that the shape conformity indicates that, when the decorative sheet is formed into a shape in which the stretching ratio is 200% or less, the decorative sheet can be stretched and can follow the shape thereof.

As shown in Table 3, by the decorative articles of Examples 8 to 14 in which the surface roughness Ra was from 0.2 to 0.7 μm, the Martens hardness was from 3.0 to 40.0 N/mm$^2$, and the thickness of the protective layer was in a range of 7 to 50 μm, it was possible to feel smooth and soft tactile impressions when the decorative articles were touched by a hand. Furthermore, the recoatability was excellent, and the quality of the appearance was excellent. Furthermore, the shape conformity was excellent, and no cracks were caused in the protective layer.

On the other hand, as shown in Table 4, the results for the decorative articles of Comparative Examples 6 to 9 were as follows.

In the decorative article of Comparative Example 6, because the thickness of the protective layer was 2 μm which was smaller than the recesses and protrusions of the release layer, the protective layer could not be formed on a portion of the release layer, and it was not possible to measure the Martens hardness. In the decorative article of Comparative Example 7, because the thickness of the protective layer was 75 μm which was great, the shape conformity was poor, and cracks were caused in the protective layer. Therefore, it was not possible to feel smoothness. In the decorative article of Comparative Example 8, the surface roughness Ra was 1.5 µm, and it was not possible to feel a smooth tactile impression. In the decorative article of Comparative Example 9, because the protective layer was formed from the urethane resin, which had the greatest crosslinking density, and because the Martens hardness was 170 N/mm$^2$ which was great, it was not possible to feel softness.

The invention claimed is:

1. A transfer sheet comprising at least a release layer, a protective layer, and an adhesive layer laminated in this order on a base sheet,
    the release layer containing particles and having a surface roughness Ra of 0.15 to 1.0 µm, the protective layer containing an ionizing radiation-curable urethane resin and having a Martens hardness of 2.0 to 40.0 N/mm$^2$, and the adhesive layer containing an acrylic resin.

2. The transfer sheet according to claim 1, wherein a thickness of the protective layer is from 5 to 50 µm.

3. A decorative article comprising a resin molded article and the transfer sheet described in claim 2 fixed on the resin molded article by the adhesive layer, the base sheet of the transfer sheet being peeled off.

4. A decorative sheet comprising a support sheet and the transfer sheet described in claim 2 fixed on the support sheet by the adhesive layer, the base sheet of the transfer sheet being peeled off.

5. A decorative article comprising a resin molded article and the decorative sheet described in claim 4 fixed on the resin molded article, the support sheet of the decorative sheet facing the resin molded article.

6. A decorative article comprising a resin molded article and the transfer sheet described in claim 1 fixed on the resin molded article by the adhesive layer, the base sheet of the transfer sheet being peeled off.

7. A decorative sheet comprising a support sheet and the transfer sheet described in claim 1 fixed on the support sheet by the adhesive layer, the base sheet of the transfer sheet being peeled off.

8. A decorative article comprising a resin molded article and the decorative sheet described in claim 7 fixed on the resin molded article, the support sheet of the decorative sheet facing the resin molded article.

\* \* \* \* \*